US006684962B1

United States Patent
Lewallen (10) Patent No.: US 6,684,962 B1
(45) Date of Patent: Feb. 3, 2004

(54) FOLDING AGRICULTURAL IMPLEMENT (75) Inventor: Dennis L. Lewallen, Beloit, KS (US)

(73) Assignee: Agco Corporation, Duluth, GA (US)

( * ) Notice: Subject to any disclaimer, the term of this patent is extended or adjusted under 35 U.S.C. 154(b) by 0 days.

(21) Appl. No.: 09/977,816

(22) Filed: Oct. 15, 2001

(51) Int. Cl.$^7$ ............................................. A01B 73/00
(52) U.S. Cl. ..................... 172/311; 172/456; 172/459; 172/662; 172/669; 111/57
(58) Field of Search .................................. 172/311, 310, 172/456, 630, 632, 633, 662, 459, 776, 668, 663, 669, 675; 111/57, 62

(56) References Cited

U.S. PATENT DOCUMENTS

| | | |
|---|---|---|
| 3,180,429 A | 4/1965 | Perhink |
| 3,321,028 A | 5/1967 | Groenke |
| 3,669,195 A | 6/1972 | Green et al. ................ 172/311 |
| 3,799,272 A | 3/1974 | Watson |
| 3,844,358 A | 10/1974 | Shuler et al. ............... 172/311 |
| 4,133,391 A | 1/1979 | Richardson et al. ........ 172/311 |
| 4,178,998 A | 12/1979 | Rockwell .................... 172/311 |
| 4,204,575 A | 5/1980 | Richardson et al. .... 172/311 X |
| 4,206,816 A | 6/1980 | Richardson et al. ........ 172/311 |
| 4,249,616 A | 2/1981 | Moe ............................ 172/311 |
| 4,316,510 A | 2/1982 | van der Lely .......... 172/311 X |
| 4,529,043 A | 7/1985 | Jensen et al. ............... 172/776 |
| 4,612,997 A | 9/1986 | Wilkins ...................... 172/776 |
| 4,619,330 A | 10/1986 | Machnee .................... 172/311 |
| 4,683,957 A | 8/1987 | Bussiere ..................... 172/311 |
| 4,700,784 A | 10/1987 | Wiebe et al. ........... 172/311 X |
| 4,867,245 A | 9/1989 | Stevens ...................... 172/311 |
| 4,974,684 A | 12/1990 | Stevens ...................... 172/311 |
| 5,178,328 A | 1/1993 | Broyhill ................. 172/311 X |
| 5,577,563 A | 11/1996 | Holen ........................ 172/456 |
| 5,921,325 A | 7/1999 | Meek et al. ................ 172/311 |
| 6,003,615 A | 12/1999 | Moore ........................ 172/456 |
| 6,089,329 A | 7/2000 | Smith ......................... 172/452 |
| 6,092,609 A | 7/2000 | Jeffery et al. ............... 172/311 |
| 6,220,366 B1 | 4/2001 | Noonan et al. ............. 172/311 |

Primary Examiner—Christopher J. Novosad
(74) Attorney, Agent, or Firm—Troutman Sanders LLP; Gerald R. Boss; Ryan A. Schneider

(57) ABSTRACT

A folding agricultural implement is disclosed having a frame including an inner section, a pair of intermediate sections, and a pair of end sections. The inner section and the end sections of the frame are equipped with lift wheel assemblies including a ground engaging wheel and a wheel cylinder connected to the ground engaging wheel for selectively raising and lowering the frame relative to the ground. The intermediate sections have no lift wheel assemblies. The joints between the end sections and the intermediate sections are held rigid when the implement is in the working position, but can be folded to move the implement into the transport position. When the implement is folded, the intermediate sections and end sections are first raised together relative to the inner section. After the intermediate sections and end sections reach a generally vertical position, the end sections are then folded downwardly over the inner section.

19 Claims, 8 Drawing Sheets

Fig.8.

FOLDING AGRICULTURAL IMPLEMENT

BACKGROUND OF THE INVENTION

1. Field of the Invention

The present invention generally relates to agricultural implements, and more particularly to implements having frames which fold for transport and unfold for field use.

2. Description of the Related Art

It is common practice for agricultural implements to be made with frames having three sections; a center section and two folding sections which are pivotally connected to the center section on opposed sides thereof. The folding sections are moveable between a generally horizontal working position and a generally vertical transport position which allows the implement to be towed through relatively narrow passages, such as gates between fields, and along public roads. In the working position, the folding sections are usually allowed to flex relative to the center section in order to more accurately follow the contours of the ground. A plurality of ground working tools are attached to each of the frame sections. Each section further includes one or more hydraulically controlled lift wheel assemblies which control the depth of cut of the ground working tools and allow the respective section to follow the terrain.

As implements of this type increase in working width, the height of the implement in the transport position can become problematic. If the folding sections are too tall, it becomes difficult to maneuver the implement under obstacles such as tree limbs and overhead utility lines. The implement can also become top-heavy and prone to tip over if the folding sections is disproportionately tall relative to the width of the center section.

One common solution to this problem is to simply increase the number of independently flexible frame sections in the implement from three to five. The two outermost sections can then be folded back over the center section, decreasing the transport height of the implement. The main problem with implements of this type is that they are relatively expensive to manufacture. Each independently flexible frame section requires a separate set of lift wheel assemblies, along with the hydraulic actuators and mechanical linkages required to operate them.

A second approach to the problem is to provide each of the folding sections with a short extension sections that folds for transport but remains rigid relative to the respective folding section in the field. The extension sections do not require their own lift wheel assemblies because they do not flex relative to the adjacent folding section. A problem with implements of this type is that the extension sections hang out past the nearest lift wheel assemblies, which are located on the adjacent folding sections, and therefore do not follow the terrain closely. This results in the ground working tools on the extension sections having an inconsistent depth of cut.

What is needed is a folding agricultural implement frame which provides an implement that is of an acceptable height in the transport position, and which provides good depth control for the ground working tools without the expense of having additional independently flexible frame sections.

SUMMARY OF THE INVENTION

The present invention is a folding agricultural implement of the type having a frame comprising a plurality of frame sections, the frame sections being moveable between a working position wherein said frame sections are arrayed generally side by side and a folded transport position. The frame sections include at least one inner or center section, a pair of intermediate sections positioned laterally outwardly from the inner section, and a pair of end sections positioned adjacent to the intermediate sections and outwardly therefrom. The inner section and the end sections of the implement are equipped with hydraulically adjustable lift wheel assemblies which serve to raise and lower the implement relative to the ground. The intermediate sections are not equipped with their own lift wheel assemblies.

The joints between the end sections and the intermediate sections of the implement frame are designed so that each end section is held rigid relative to the adjacent intermediate section when the implement is in the working position, but can still be folded to move the implement into the transport position. This selectively rigidity between the end sections and intermediate sections allows the intermediate sections to be supported by the lift wheel assemblies on the end sections when the implement is in the working position while preventing the joints between the sections from sagging. The desired rigidity is provided by fold linkages, each of which comprise first and second links, the first link having a first end pivotally connected to an intermediate frame section and a second end; the second link having a first end pivotally connected to the first link second end and a second end pivotally connected to the adjacent end section. A linear actuator is connected between one of the frame sections and one of the links for folding the end section relative to the intermediate section.

When the implement is in the working position, the actuator holds the first and second links in a position wherein they are generally linearly aligned to over-centered with respect to one another. In this position, the fold linkages cooperate with the actuators to hold the end sections rigid relative to the intermediate sections and prevent the outer joints from sagging. The linkages take part of the pressure off of the respective actuators so that the actuators are not solely responsible for holding the respective joints rigid.

Because the implement does not have lift wheel assemblies mounted on the intermediate sections, the usual outside-section-to-inside section method of folding an implement is not preferable. If the end sections were raised first relative to the intermediate sections, neither the end sections nor the intermediate sections would be supported, and the combined weight would cause the joints between the inner sections and the intermediate sections to sag. In order to alleviate this problem, the implement folds in different fashion than is the norm; the intermediate sections and end sections are first raised together relative to the inner section. After the intermediate sections and end sections reach a generally vertical position, the end sections are then folded downwardly over the inner section.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain objects and advantages of this invention will become apparent from the following description taken in conjunction with the accompanying drawings wherein are set forth, by way of illustration and example, certain embodiments of the invention.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
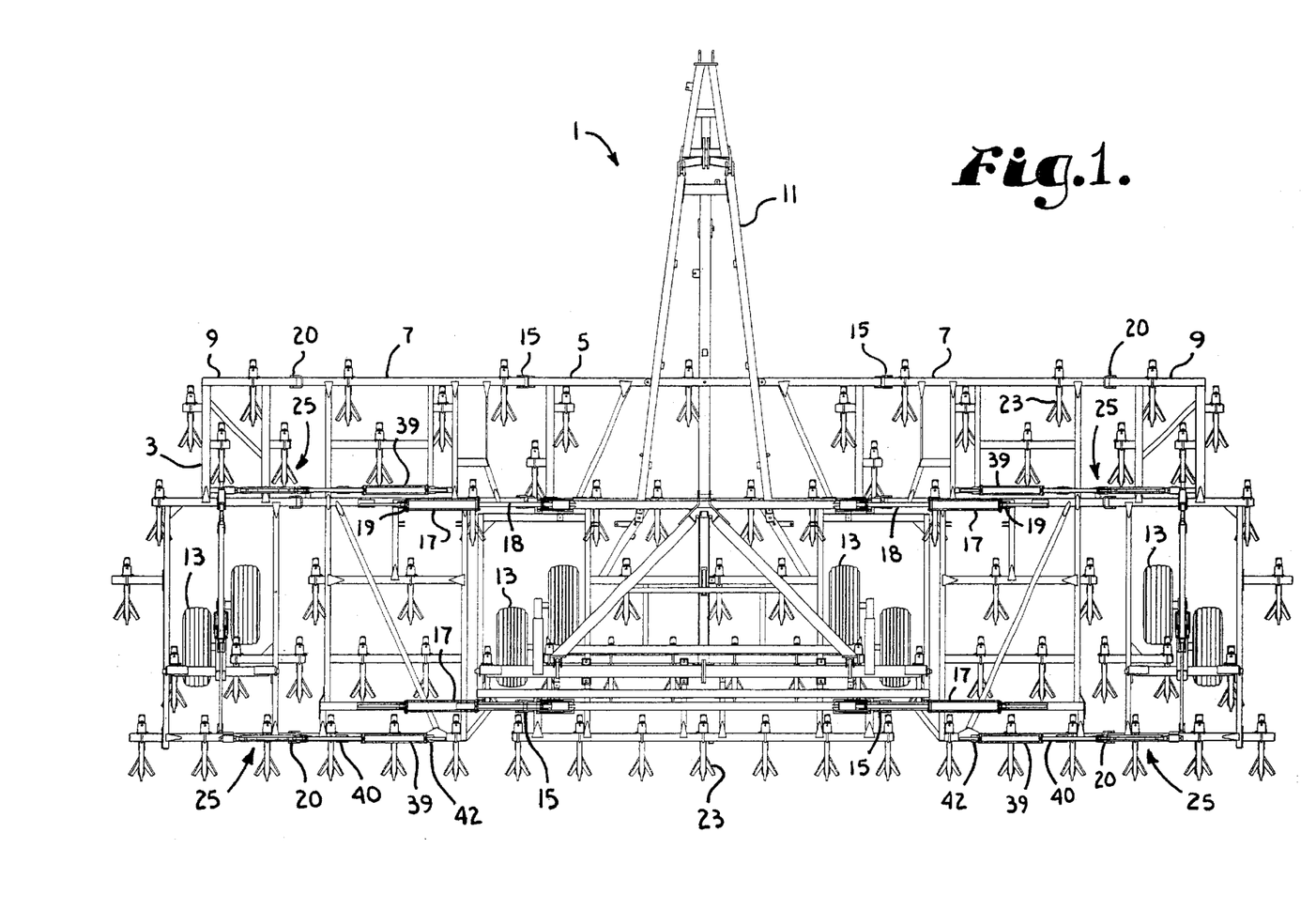
FIG. 1 is a plan view of an agricultural implement embodying the present invention.

Referring to the drawings in more detail, the reference number 1 generally designates a folding agricultural implement embodying the present invention. The implement 1 will be depicted herein as being a cultivator, however the folding apparatus and method of the present invention have application to agricultural implements other than cultivators, and therefore the depiction of the implement 1 as a cultivator is not intended to be limiting. Referring to FIG. 1, the implement 1 includes a frame 3 having at least five frame sections including a center or inner section 5, a pair of intermediate sections 7, and a pair of end sections 9. It is to be understood that the implement 1 could include additional frame sections if a wider implement 1 is desired.

Figures 2, 3:
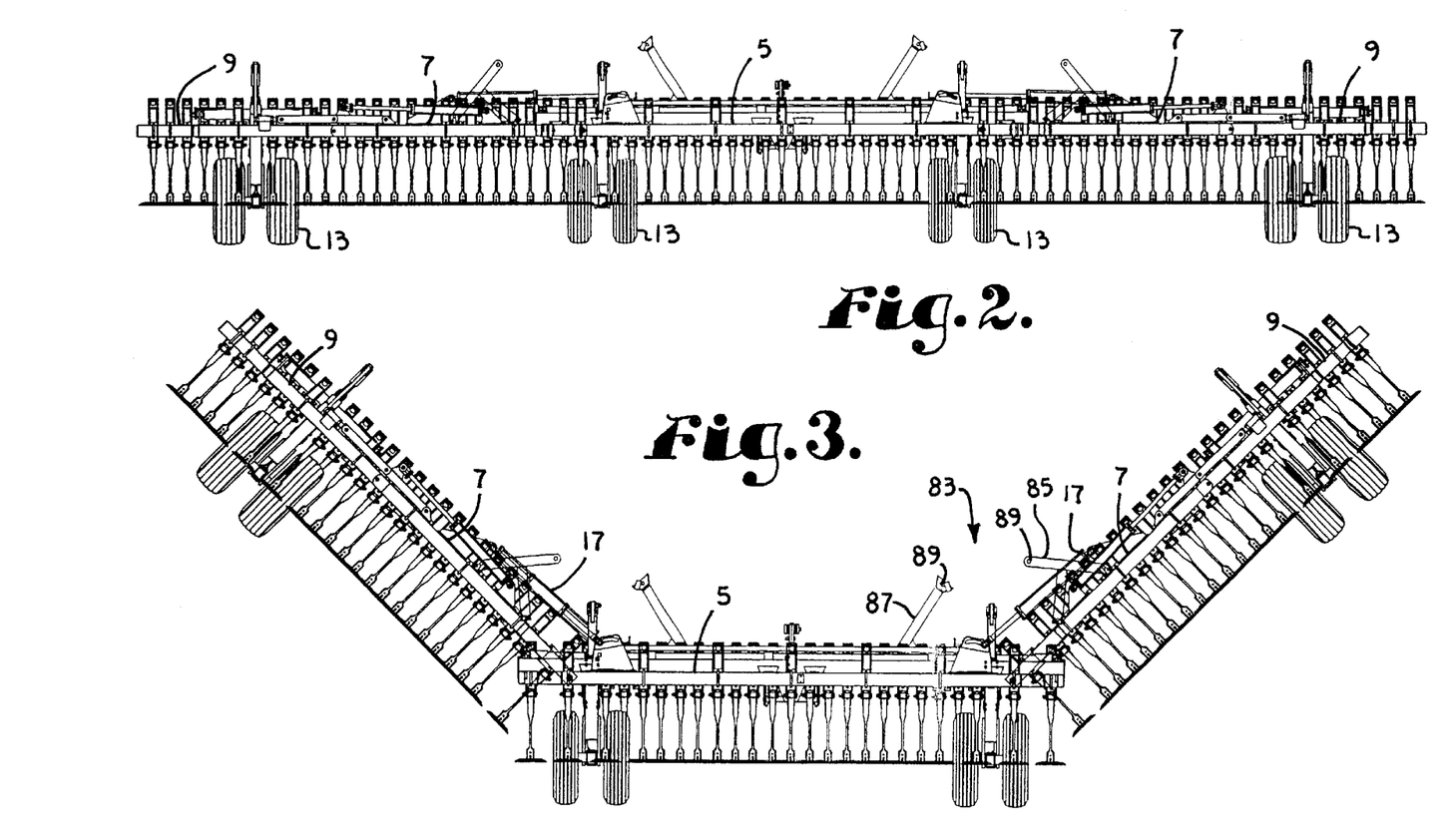
FIG. 2 is a rear view of the implement of FIG. 1 showing the implement in a fully unfolded or working position.
FIG. 3 is a rear view of the implement of FIG. 1 showing the implement in a partially folded position with the intermediate and outer sections thereof being raised in unison relative to the center section.
Figure 4:
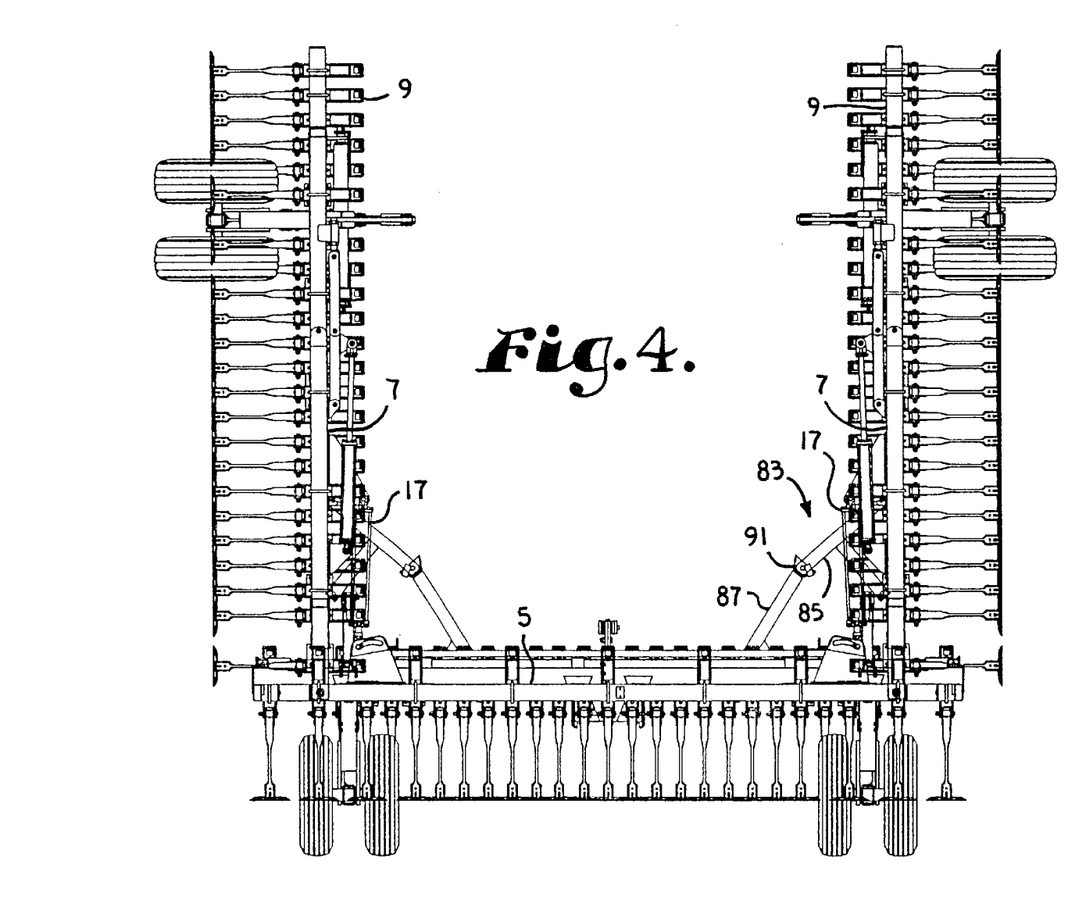
FIG. 4 is a rear view of the implement of FIG. 1 showing the implement in a partially folded position with the intermediate and outer sections thereof being raised to a generally perpendicular orientation relative to the center section.
Figure 5:
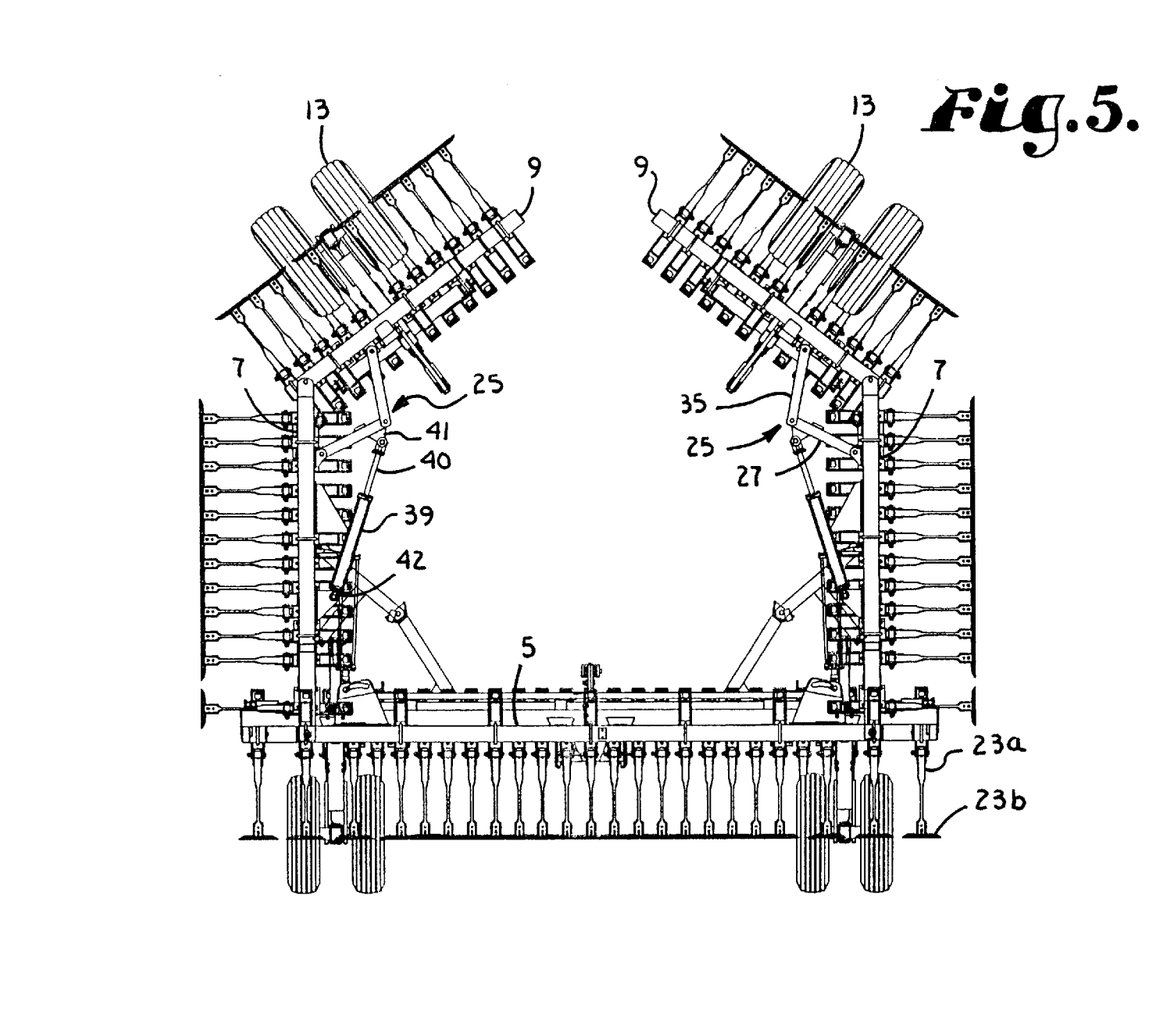
FIG. 5 is a rear view of the implement FIG. 1 showing the implement in a partially folded position with the outer sections thereof being lowered inwardly relative to the intermediate sections.
Figure 6:
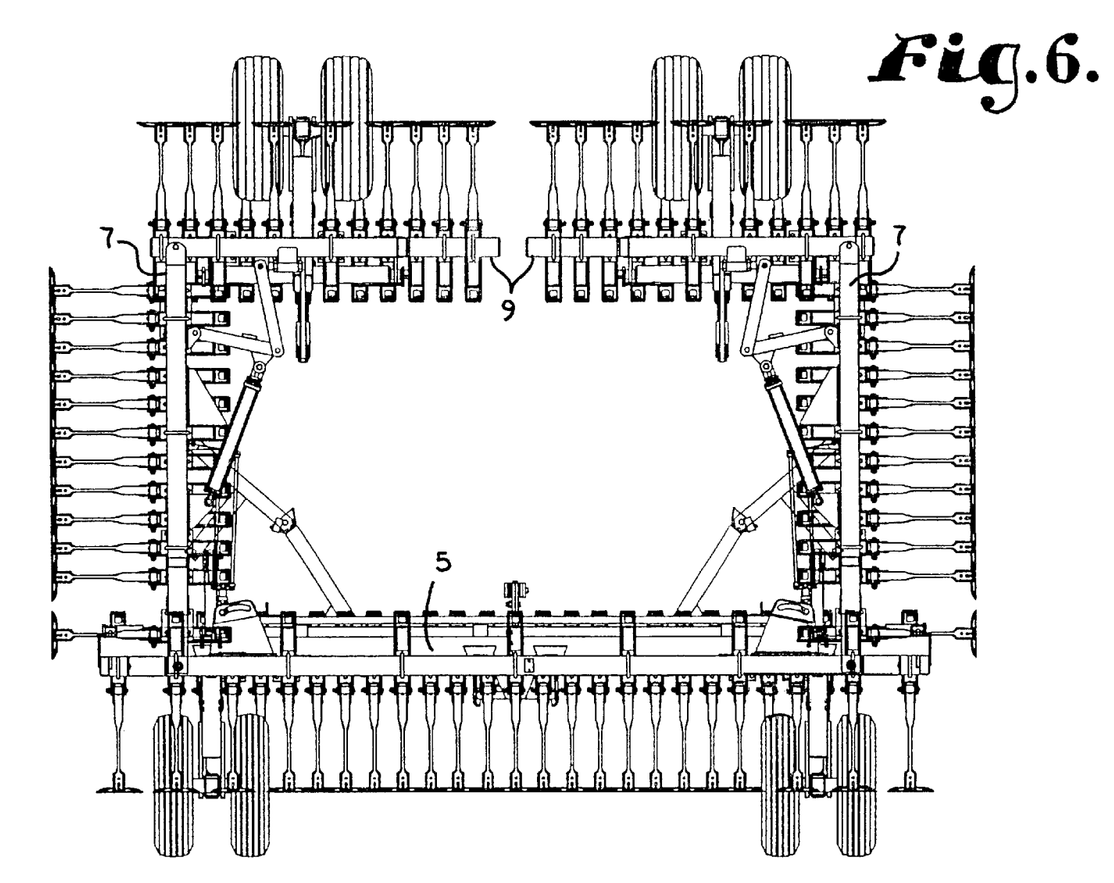
FIG. 6 is a rear view of the implement of FIG. 1 showing the implement in a fully folded or transport position.

The center section 5 includes a hitch 11 for connecting the implement 1 to a prime mover (not shown) such as a farm tractor. The center section 5 is equipped with one or hydraulically adjustable lift wheel assemblies 13 which include linear actuators or wheel cylinders 14 (see FIG. 9) which are operable to vary the distance between the frame 3 and the ground. The intermediate sections 7 are pivotally connected to opposing sides of the center section 5 at respective inner joints 15 so as to be moveable between a working position wherein the intermediate sections 7 extend laterally outwardly from the center section 5 in opposing directions (as shown in FIGS. 1 and 2), and a folded position wherein the intermediate sections 7 extend upwardly from the center section 5 (as shown in FIGS. 4–6). A pair of first double-acting linear actuators or first fold cylinders 17 are provided for moving each intermediate section 7 between the working and folded positions. Each first fold cylinder 17 has an extensible rod 18 connected to the center section 5 and a cylinder base 19 connected to the respective intermediate section 7. An important advantage of the implement 1 is that the intermediate sections 7 do not need to be equipped with lift wheel assemblies 13, as best seen in FIGS. 5 and 6.

Referring again to FIG. 1, the end sections 9 are each pivotally connected to the outer end of a respective one of the intermediate sections 7 at an outer joint 20 and are each moveable between a working position wherein the end section 9 extends outwardly from the adjacent intermediate section 7 (see FIGS. 1–4), and a folded position wherein the end section 9 extends generally perpendicularly to the intermediate section 7 (see FIG. 6). Like the center section 5, the end sections 9 are each supported by one or more lift wheel assemblies 13. The end sections 9 are generally shorter than the other sections of the frame 3, but since they are supported by lift wheel assemblies 13, they can be longer than the unsupported extension sections used on prior art machines.

Figure 9:
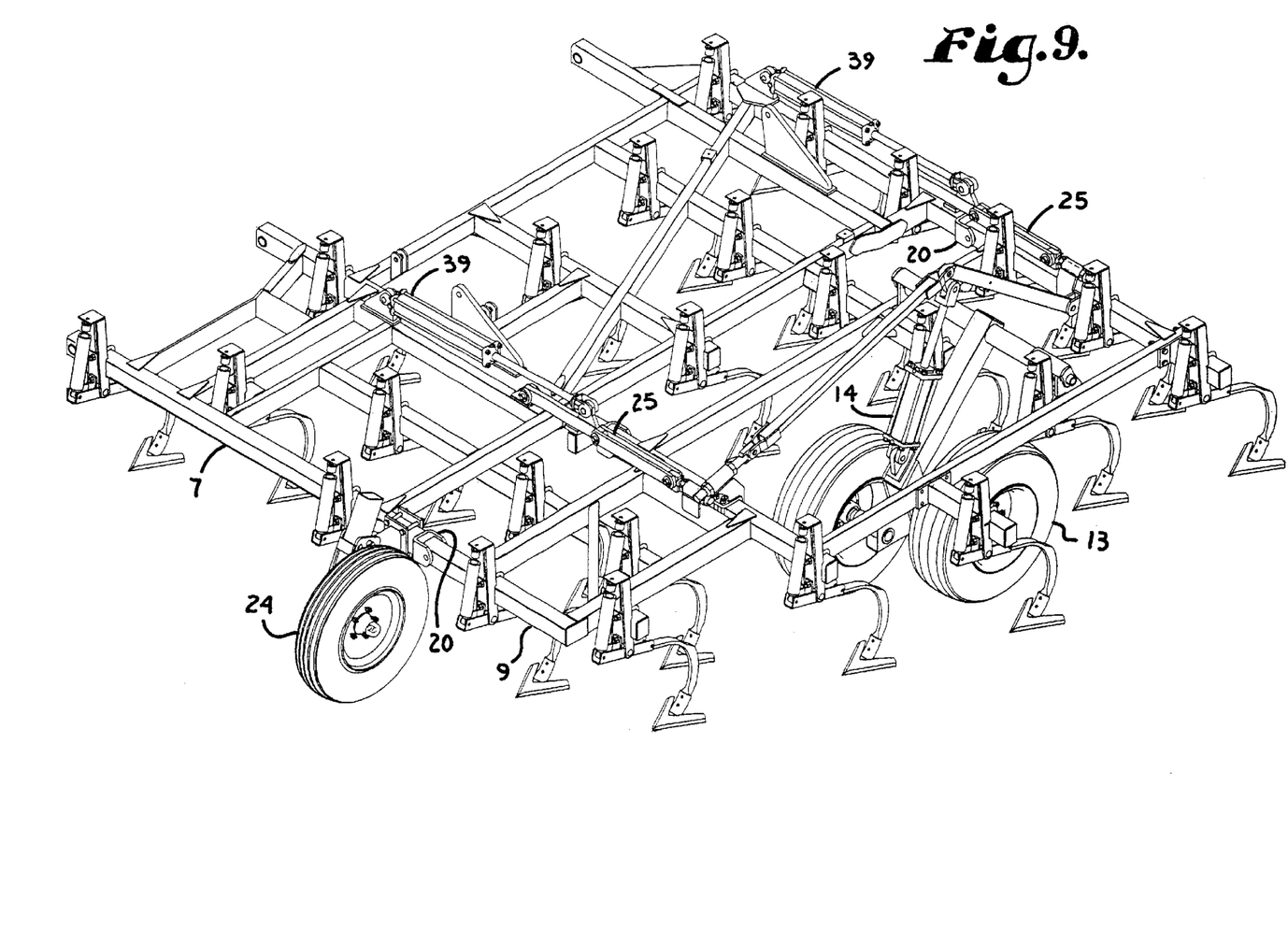
FIG. 9 is a fragmentary perspective view of an implement embodying the present invention showing an outer and intermediate frame section thereof.

A plurality of ground working tools 23, such as cultivator shanks 23a with sweeps 23b (see FIG. 5), are attached to each of the frame sections 5, 7 and 9 and extend downwardly therefrom when the frame sections 7 and 9 are in the working position. The ground working tools 23 are brought into contact with the ground by hydraulically lowering the frame 3 via the wheel cylinders 14. Referring to FIG. 9, the implement 1 may include optional gauge wheels 24 which are attached to the front of the implement 1 and prevent the front of the machine from being torqued downwardly due to the force created by the ground working tools 23 when the implement 1 is in the field. The gauge wheels 24 are not equipped with wheel cylinders 14 and are not in contact with the ground except when the lift wheel assemblies 13 are lowered for field work. The gauge wheels 24 are preferably attached to the intermediate sections 7 proximate the outer joint 20. On larger implements 1 (not shown), gauge wheels 24 may be attached to both the intermediate sections 7 and the outer section 9.

Figure 7:
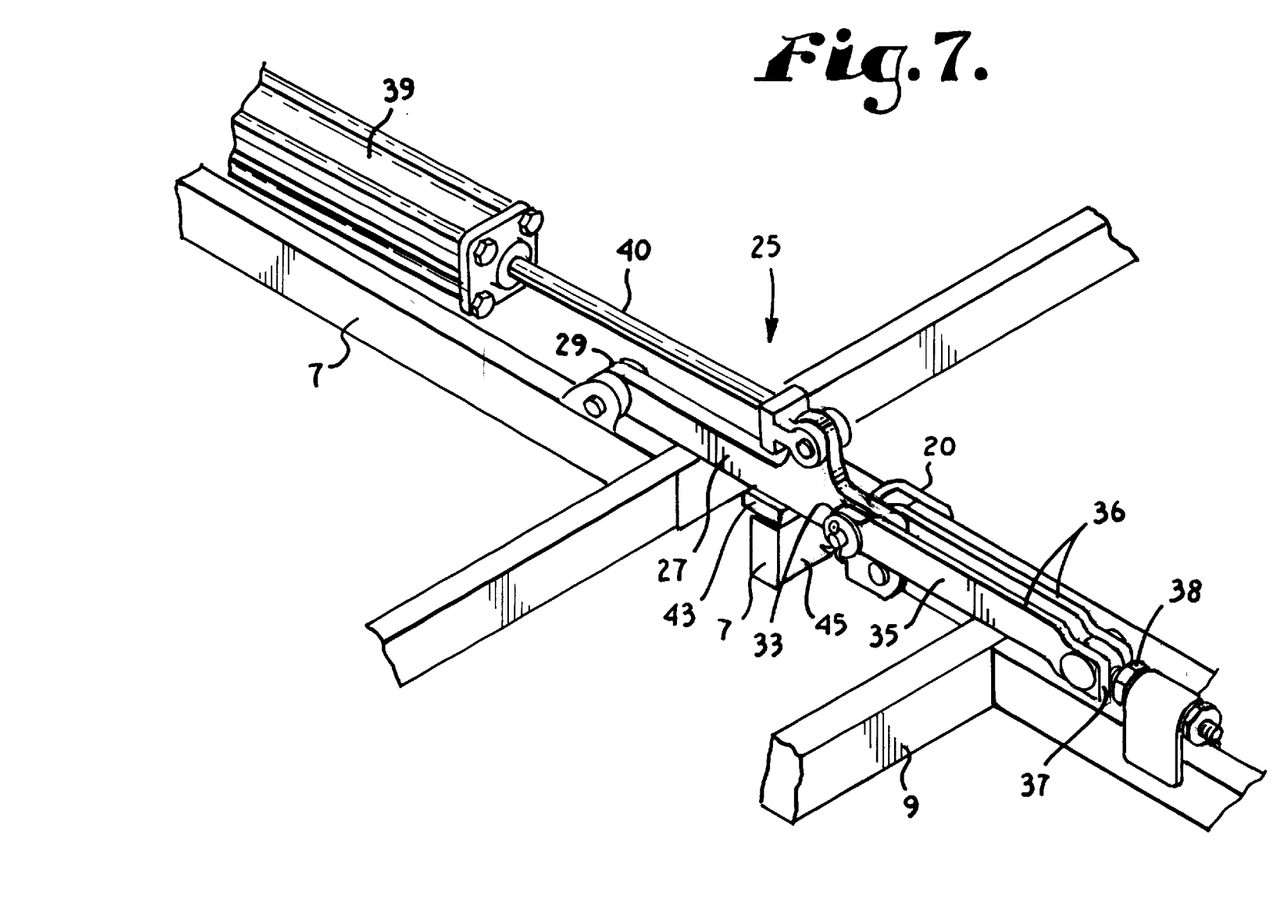
FIG. 7 is an enlarged fragmentary perspective view of the implement of FIG. 1 showing one of the fold linkages thereof.

The end sections 9 are connected to the intermediate sections 7 in such a fashion that the outer joints 20 remain rigid when the implement 1 is in the working position, but are foldable for transport. This selective rigidity between each intermediate section 7 an the adjacent end sections 9 is provided by fold linkages 25. The fold linkage 25, as best seen in FIG. 7, each include a first line 27 having a first end 29 pivotally connected to the respective intermediate section 7. A second end 31 of the first link 27 is pivotally connected to a first end 33 of a second link 35. The second link 35 is shown in FIG. 7 as comprising a pair of plates 36 positioned on opposing sides of the first linked 27. A second end 37 of the second link 35 is pivotally connected to the respective end section 9. The connection between the second end 37 of the second link 35 and the end section 9 preferably includes an adjustment mechanism 38 whereby the end section 9 can be leveled relative to the adjacent intermediate section 7.

Second double-acting linear actuators or second fold cylinders 39 are provided for moving the end sections 9 between the working and folded positions. Each second fold cylinder 39 has a extensible rod 40 connected to a lug 41 on a respective one of the first links 27 proximate the second end 31 thereof and a cylinder base 42 (see FIG. 5) connected to the respective intermediate section 7. Referring again to FIG. 1, two fold linkages 25 with respective second fold cylinders 39 are provided for each of the end sections 9; one positioned proximate the rear of the implement 1, and one spaced forwardly therefrom along the respective outer joint 20.

When the implement 1 is in the working position, the second fold cylinders 39 are extended such that the first links 27 are either linearly aligned with the respective second links 35 or slightly over-centered relative thereto (as shown in FIG. 7). Stops 43 on the first links 27 engage respective portions 45 of the intermediate frame sections 7 to prevent the fold linkage 25 from becoming too far over-centered. In this position, the linkages 25 hold the end sections 9 rigid relative to the intermediate sections 7 and prevent the outer joints 20 from sagging. The linkages 25 also take part of the pressure off of the respective second fold cylinders 39 so that the cylinders 39 are not solely responsible for holding the outer joints 20 rigid.

Prior art implement frames having five or more sections have generally fold sequentially from the outermost joint to the innermost joint; i.e. the second sections would be raised first relative to the intermediate sections, and then the intermediate sections would be raised relative to the center section. However, because the implement 1 disclosed herein does not have lift wheel assemblies 13 mounted on the intermediate sections 7, the standard method of folding is not preferable. If the end sections 9 were raised first relative to the intermediate sections 7, neither the end sections 9 nor the intermediate sections would be supported, and the combined weight of the frame sections 7 and 9 would cause the inner joints 15 to sag. If this were to occur, the ground working tools 23 on the portion of the intermediate section 7 proximate the outer joint 20 would come into contact the ground and bear the combined weight of the frame sections 7 and 9, possibly resulting in damage thereto.

In order to prevent the inner joints 15 from sagging during the folding process as previously described, the implement 1 is designed to fold such that the intermediate sections 7 are first lifted to a position generally perpendicular to the center section 5, and only then do the end sections 9 fold downwardly over the center section 5. FIG. 3 shows the intermediate sections 7 in the process of being raised, and FIG. 4 shows the intermediate sections 7 raised in a perpendicular alignment relative to the center section 5. The unfolding process of the implement 1 is accomplished in the reverse order to that described for the folding process; i.e. the end sections 9 are first pivoted upwardly until they are generally linearly aligned with the intermediate sections 7; and are then held rigid relative to the intermediate sections 7 while the intermediate sections 7 are pivoted downwardly into the working position.

Figure 8:
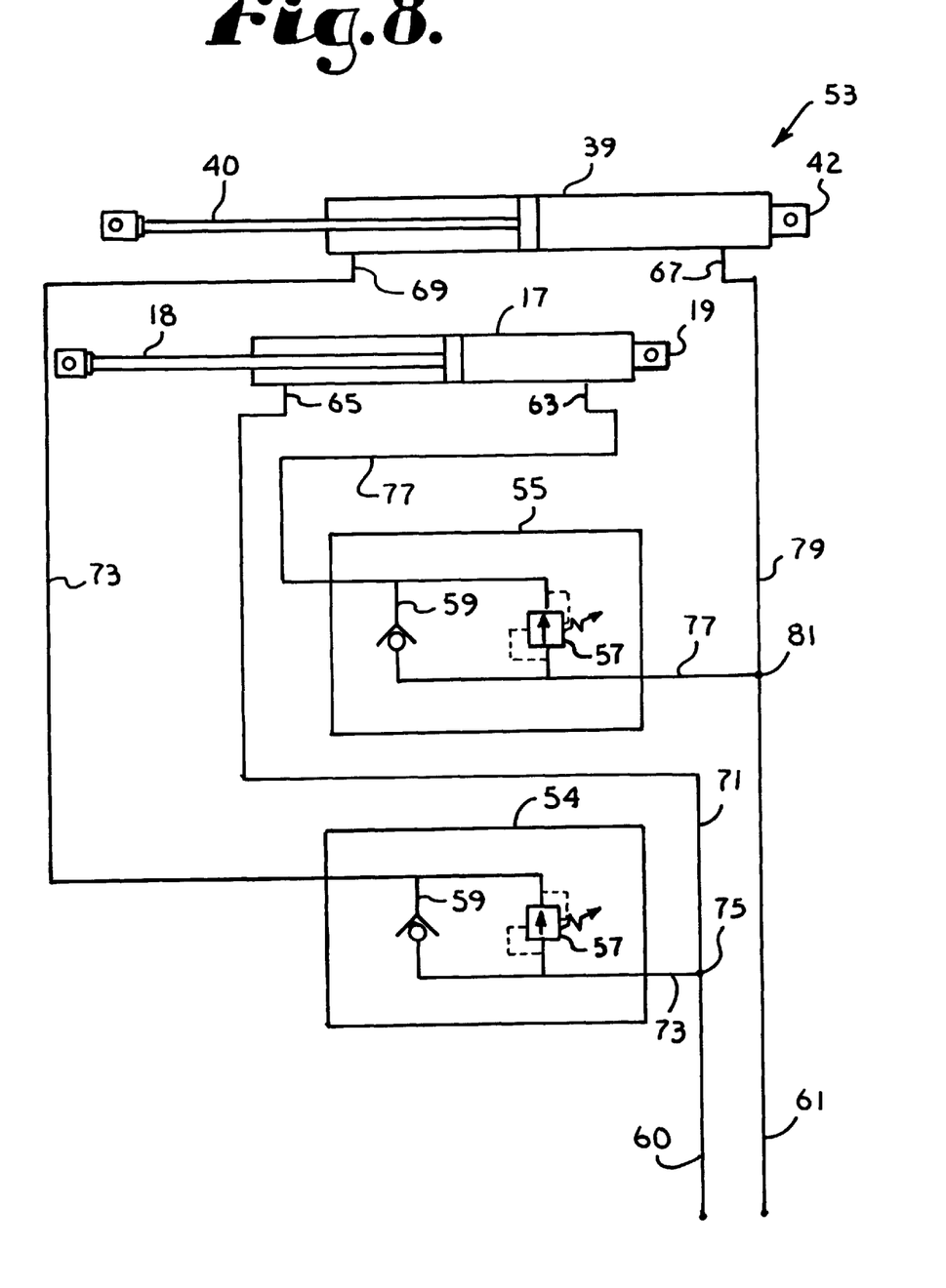
FIG. 8 is a schematic diagram showing a portion of the hydraulic circuit of the implement of FIG. 1.

Referring to FIG. 8, the desired folding action is produced using a hydraulic circuit 53 which includes first and second counterbalance valves 54 and 55, each of which comprise a pressure relief valve 57 plumbed in parallel with a check valve 59. FIG. 8 comprises a simplified schematic diagram of the circuit 53, showing only a single first fold cylinder 17 and a single second fold cylinder 39. The remainder of the cylinders 17 and 39 are plumbed into the circuit 53 in parallel with the respective cylinders 17 and 39 shown.

Hydraulic pressure is supplied to the hydraulic circuit 53 from a pressurized hydraulic source in the tractor (not shown) through first and second hydraulic lines 60 and 61. The direction of fluid flow through the lines 60 and 61 is reversible by operation of a lever in the tractor. When moving the implement 1 from the working position to the transport position, the first hydraulic line 60 acts as a supply line and the second hydraulic line 61 acts as a return line. Conversely, when moving the implement 1 from the transport position to the working position, the first hydraulic line 60 acts as the return line and the second hydraulic line 61 acts as the supply line.

As is conventional for double-acting hydraulic cylinders, each of the first fold cylinders 17 has a base end port 63 and a rod end port 65. Supplying pressurized hydraulic fluid to the base end port 63 of a cylinder 17 will cause the rod 18 to extend. Conversely, supplying pressurized hydraulic fluid to the rod end port 65 will cause the rod 18 to retract. Similarly, each of the second fold cylinders 39 has a base end port 67 and a rod end port 69 and extends and retracts in the same manner as described for the first fold cylinders 17.

The first hydraulic line 60 divides into a first leg 71 and a second leg 73 at a junction 75. The first leg 71 is connected to the rod end ports 65 of the first fold cylinders 17. The second leg 73 is connected through the first counterbalance valve 54 to the rod end ports 69 of the second fold cylinders 39. Similarly, the second hydraulic line 61 divides into a first leg 77 and a second leg 79 at a junction 81. The first leg 77 is connected through the second counterbalance valve 55 to the base end ports 63 of the first fold cylinders 17. The second leg 79 is connected to the base end ports 67 of the second fold cylinders 39.

When raising the implement 1 from the working position (FIGS. 1 and 2) to the transport position (FIG. 6), hydraulic fluid is supplied through the first hydraulic line 60. The fluid flows freely through the first leg 71 to the rod end ports 65 of the first fold cylinders 17, causing the rods 18 to retract and lifting the intermediate sections 7 (FIG. 3). Fluid returns from the base ports 63 of the first fold cylinders 17 through the first leg 77 of the second hydraulic line 61, the check valve 59 of the second counterbalance valve 55 opening to allow fluid to flow through the counterbalance valve 55 in this direction.

During the raising of the intermediate sections 7, the relief valve 57 of the first counterbalance valve 54 remains closed. This prevents fluid from flowing to the rod end ports 69 of the second fold cylinders 39, causing the end sections 9 to remain rigid relative to the intermediate sections 7. When the intermediate sections 7 reach their transport position (FIG. 4), the first fold cylinders 17 come to the end of their stroke and pressure begins to build in the first hydraulic line 60. When the pressure in line 60 reaches a preset relief pressure, the respective relief valve 57 opens, allowing fluid to flow to the rod end ports 69 of the second fold cylinders 39. The rods 40 of the cylinders 39 then begin to retract, folding the end sections 9 downwardly over the center section 5 (FIG. 5). Fluid returns freely from the base end ports of the second fold cylinders 39 through the second leg 79 of the second hydraulic line 61. When the end sections 9 reach their transport positions (FIG. 6), fluid flow is shut off by the operator.

The first counterbalance valve 54 generally functions as first control means for preventing advancement of the rods 40 of the second fold cylinders 39 toward the retracted position until the rods 18 of the first fold cylinders 17 are fully retracted.

Referring to FIGS. 3 and 4, a locking mechanism 83 is provided for locking the intermediate sections 7 in the transport position. The locking mechanism 83 includes a pair of locking bars 85, each of which extends outwardly from a respective one of the intermediate sections 7, and a pair of sockets 87 which extend outwardly from the center section 5, one socket 87 toward each of the intermediate sections 7. The bars 85 engage the sockets 87 when the intermediate sections 7 are in the transport position, as seen in FIGS. 4–6. Referring to FIG. 3, holes 89 are provided in the bars 85 and sockets 87 for mutually receiving a locking pin 91, as generally shown in FIG. 4. The locking pins 91 prevent the intermediate sections 7 from lowering unexpectedly.

When the implement 1 is lowered from the transport position (FIG. 6) to the working position (FIGS. 1 and 2), pressurized hydraulic fluid is supplied through the second hydraulic line 61. The fluid flows freely through the second leg 79 to the base end ports 67 of the second fold cylinders 39, causing the rods 40 to extend and lifting or pivoting the end sections 9 into generally vertical and planar alignment with the intermediate sections 7 (FIG. 4). Fluid returns from the rod end ports 69 of the second fold cylinders 39 through the second leg 73 of the first hydraulic line 60, the check valve 59 of the first counterbalance valve 54 opening to allow fluid to flow through the counterbalance valve 54 in this direction.

During the raising of the end sections 9, the relief valve 57 of the second counterbalance valve 55 remains closed, preventing fluid from flowing to the base end ports 63 of the first fold cylinders 17. This prevents the intermediate sections 7 from moving from their transport position until after the end sections 9 are fully raised or pivoted into alignment with the intermediate sections 7. When the end sections 9 reach their aligned position (FIG. 4), the second fold cylinders 39 come to the end of their stroke and pressure begins to build in the second hydraulic line 61. When the pressure in line 61 reaches a preset relief pressure, the respective relief valve 57 opens, allowing fluid to flow to the base end ports 63 of the first fold cylinders 17. The rods 18 of the cylinders 17 then begin to extend, lowering the intermediate sections 7 toward their working position (FIG. 3). Fluid returns freely from the rod end ports 65 of the first fold cylinders 17 through the first leg 71 of the first hydraulic line 60. When the intermediate sections 7 and attached end sections 9 reach their working position (FIGS. 1 and 2), fluid flow is shut off by the operator.

The second counterbalance valve 55 generally serves as a second control means for preventing advancement of the rods 18 of the first fold cylinders 17 toward the extended position until the rods 40 of the second fold cylinders 39 are fully extended.

It is to be understood that while certain forms of the present invention have been illustrated and described herein, it is not to be limited to the specific forms or arrangement of parts described and shown. For example, it is foreseen that linear actuators other than double-acting hydraulic cylinders could be utilized for pivoting the frame sections 7 and 9. relative to the center section 5 and to one another. In addition, it is foreseen that, depending upon the type of actuator utilized, various types of control means could be used to prevent extension of one set of actuators until the other was fully extended or retracted. For example, the control means for some types of actuators might comprise an electronic circuit.

What is claimed and desired to be secured by Letters Patent is as follows:

1. A folding agricultural implement having a frame comprising:
    an inner section;
    an intermediate section pivotally connected to the inner section at an inner joint, the intermediate section having no ground engaging wheel;
    and an end section pivotally connected to the intermediate section at an outer joint; and
    the implement having a working position and a folded transport position, the working position wherein the frame sections are arrayed generally side-by-side, and the folded transport position wherein the intermediate section is in a generally vertical position, and the end section is folded downwardly over the inner section such that the end section and the inner section are generally parallel.

2. The implement as in claim 1 wherein the inner section and the end section have one or more ground engaging wheels.

3. The implement as in claim 2 wherein the inner section and the end section further have a wheel cylinder connected to the one or more ground engaging wheels for selectively raising and lowering the frame relative to the ground.

4. The implement as in claim 1 further comprising a locking mechanism for locking the intermediate section in the generally vertical position of the folded transport position.

5. The implement as in claim 4 wherein the locking mechanism comprises a locking bar extending outwardly from the intermediate section, and a socket extending outwardly from the inner section.

6. The implement as in claim 5 wherein the locking bar can engage the socket when the intermediate section is in the generally vertical position of the folded transport position, wherein upon such engagement of the locking bar and socket, holes provided in the locking bar and socket can mutually receive a locking pin to prevent the intermediate section from lowering unexpectedly.

7. The implement as in claim 1 and further comprising:
    a first linear actuator connected between the inner section and the intermediate section and advanceable between an extended position wherein the intermediate section extends in generally coplanar alignment with the inner section and a retracted position wherein the intermediate section is folded relative to the inner section;
    a second linear actuator connected between the intermediate section and the end section and advanceable between an extended position wherein the end section extends in generally coplanar alignment with the intermediate section and a retracted position wherein the end section is folded relative to the intermediate section; and
    first control means for preventing advancement of the second linear actuator toward the retracted position until the first linear actuator is advanced into the retracted position.

8. The implement as in claim 7 and further comprising second control means for preventing advancement of the first linear actuator toward the extended position until the second linear actuator is advanced into the extended position.

9. The implement as in claim 1 wherein the outer joint is held rigid when the implement is in the working position.

10. The implement as in claim 1 and further comprising:
    a fold linkage including:
        a first link having a first end pivotally connected to the intermediate section and a second end; and
        a second link having a first end pivotally connected to the first link second end and a second end pivotally connected to the end section; and a linear actuator connected between the frame and one of the first and second links for folding the end section relative to the intermediate section;

wherein the linear actuator cooperates with the first and second links to hold the outer joint rigid when the implement is in the working position.

11. The implement as in claim 10 wherein the linear actuator is connected between the intermediate section and the first link.

12. The implement as in claim 10 wherein the first and second links are generally linearly aligned when the implement is in the working position.

13. The implement as in claim 10 wherein the first and second links are over-centered with respect to one another when the implement is in the working position.

14. The implement as in claim 1 and further including a plurality of ground working tools extending downwardly from the frame and a gauge wheel connected to a front portion of the frame to counteract rotational force created by the ground working tools engaging the ground.

15. The implement in claim 14 wherein the gauge wheel is connected to the intermediate section.

16. The implement as in claim 1 and further comprising a lift wheel assembly including a ground engaging wheel and a wheel cylinder connected to the ground engaging wheel for selectively raising and lowering the frame relative to the ground, at least one lift wheel assembly being equipped to the inner section and end sections.

17. The implement as in claim 10 further comprising a first pivoting means and a second pivoting means, the first and second pivoting means moving the implement between the working position and the folded transport position, wherein the first pivoting means pivots an intermediate and end section as one rigid structure about the inner section, between the generally side-by-side array with the inner section, and the generally vertical position, and wherein the second pivoting means pivots and end section downwardly over the inner section such that the end section and the inner section are generally parallel.

18. The implement as in claim 17, wherein the first pivoting means comprises a first linear actuator connected between the inner section and an intermediate section and advanceable between an extended position wherein the intermediate section extends in generally coplanar alignment with the inner section and a retracted position wherein the intermediate section is folded relative to the inner section, and wherein the second pivoting means comprises a second linear actuator connected between an intermediate section and an end section and advanceable between an extended position wherein the end section extends in generally coplanar alignment with the intermediate section and a retracted position wherein the end section is folded relative to the intermediate section.

19. A folding agriculture implement having a frame comprising:

an inner section;

an intermediate section pivotally connected to the inner section at an inner joint;

and an end section pivotally connected to the intermediate section at an outer joint; and a locking mechanism for locking the intermediate section in the generally vertical position of the folded transport position;

the implement having a working position and a folded transport position, the working position wherein the frame sections are arrayed generally side-by-side, and the folded transport position wherein the intermediate section is in a generally vertical position, and the end section is folded downwardly over the inner section such that the end section and the inner section are generally parallel;

wherein the locking mechanism incorporates a locking bar extending outwardly from the intermediate section, and a socket extending outwardly from the inner section;

wherein the locking bar can engage the socket when the intermediate section is in the generally vertical position of the folded transport position; and wherein upon such engagement of the locking bar and socket, holes provided in the locking bar and socket can mutually receive a locking pin to prevent the intermediate section from lowering unexpectedly.

* * * * *